INVENTOR.
CLEMENT V. FOGELBERG
WILLIAM D. HOUGH
BY
Campbell, Harris and O'Rourke
ATTORNEYS

United States Patent Office 3,611,493
Patented Oct. 12, 1971

3,611,493
VARIABLE ORIFICE EXTRUDER HEAD
Clement V. Fogelberg, Boulder, and William D. Hough, Arvada, Colo., assignors to Ball Corporation
Filed Dec. 24, 1968, Ser. No. 786,709
Int. Cl. B29d 23/04
U.S. Cl. 18—142                                             3 Claims

ABSTRACT OF THE DISCLOSURE

A programable extruder head having a movable extrusion die assembly slidably mounted upon a fixed extrusion barrel and a fixed mandrel secured within the extrusion barrel, wherein the interface between the extrusion barrel and die assembly is in the form of a knife edge surface slidably bearing upon an insert planar surface.

---

This invention relates to a programable extruder head for extrusion of parisons of polymeric materials. More particularly, this invention relates to a programable extruder head for extrusion of easily degradable polymers whereby parisons having proper wall thicknesses may be extruded of degradable polymers for extended periods of time.

As is well known in the art, tubes or parisons of heated polymeric materials are formed by extrusion for use in blow molding operations. Finished articles, such as plastic bottles, are formed from the heated parison by fully enclosing such a parison within a sectional mold. A fluid substance is then injected into the interior of the parison under pressure to forcefully expand and urge the parison into contact with the mold walls. Heat transfer to the mold and fluid causes the expanded and formed parison, now a shaped article, to quickly cool and become sufficiently rigid to maintain its shape. The mold may then be opened and the formed article removed.

From the above succinct and oversimplified description of blow molding, it will be recognized that, in many cases, expansion of the parison will not be equal at all portions of the parison wall. Also, many bottles require extra thickness in specified portions of the walls thereof to provide adequate structural strength. For these reasons, it is often necessary to vary the thickness of the parison wall in order that expansion of the parison and demands of the article be met. An example of an apparatus for accomplishing this is to be found in U.S. Pat. No. 3,262,152. Yet another example of such an extruder may be found in U.S. Pat. No. 3,144,682. Programming of the parison wall thickness is almost universally attained by varying the outlet orifice of the extruder head. By varying this orifice size, the wall thickness of the parison may be conveniently and accurately controlled.

Recently, there has developed a demand for clear plastic bottles. The more conventional blow molded plastic bottles, usually of polyolefins and particularly stereospecific polyethylene, were either pigmented and opaque or, at best, translucent. However, the newer vinyl type materials yield a finished product which is transparent and clear. Such vinyl blow molded bottles resemble glass in appearance, but display the advantages of polymer bottles such as light weight and resilience.

While some marginal success has been attained in blow molding vinyl bottles on a commercial basis, there exists one basic and serious problem. That is the propensity of many of the clear vinyl compounds to undergo degradation at a temperature adjacent its melting temperature, and sometimes lower than its melting temperature. Fortunately, the reaction kinetics of the degradation reaction are sufficiently slow as to enable the composition to be melted, extruded, formed and cooled before degradation is apparent. Thus, in theory, it is possible to work with and form articles above the degradation temperature of the compound. In practice, this approach has caused substantial problems. One of the more important problems is the fact that, once degradation occurs to a significant portion of the mold polymer, the degradation products, often carbon, hydrochloric acid, and other such products, function as a catalyst for the degradation reaction thereby seriously and undesirably affecting the kinetics of the reaction.

Once degradation ensues in a molten vinyl polymer, the heat generated by the degradation and the reaction products generally cause a chain reaction causing the polymer in the extrusion barrel and the extruder head, and generally all molten polymer, to degrade. The degradation products, such as carbon, coat and foul the apparatus while the degradation products such as hydrochloric acid often attack the metal surfaces of the extruder and extruder head causing pitting and other damage. It has been found that the extruder head is very critical in this system in that the polymer in the extruder head, being at the terminal portion of the extrusion system, has been molten for the greatest period of time. This is particularly critical in situations where the extruder head includes means for programming the parison. The more complicated structure necessary to provide programming of the parisons often lends itself to the type of conditions which cause degradation.

It is therefore an object of this invention to provide an extruder head configuration which permits production of programmed parisons of degradable polymers.

Another object of this invention is to provide an extruder head configuration which permits extended extrusion operation while producing parisons of easily degradable polymers.

Yet another object of this invention is to provide an extruder head configuration and construction which is resistant to the harmful effects of the degradation products of degradable polymers.

Still yet another object of this invention is to provide an extruder head configuration wherein the critical sealing-bearing surface exposed to the extrudate is a tough self-lubricating, temperature-resistant, inert material in the form of a replaceable insert.

Still other objects of the invention will be apparent from the drawings and following discussion.

For purposes of illustration, the preferred embodiments of the invention are shown in the drawings, in which.

Figure 1:
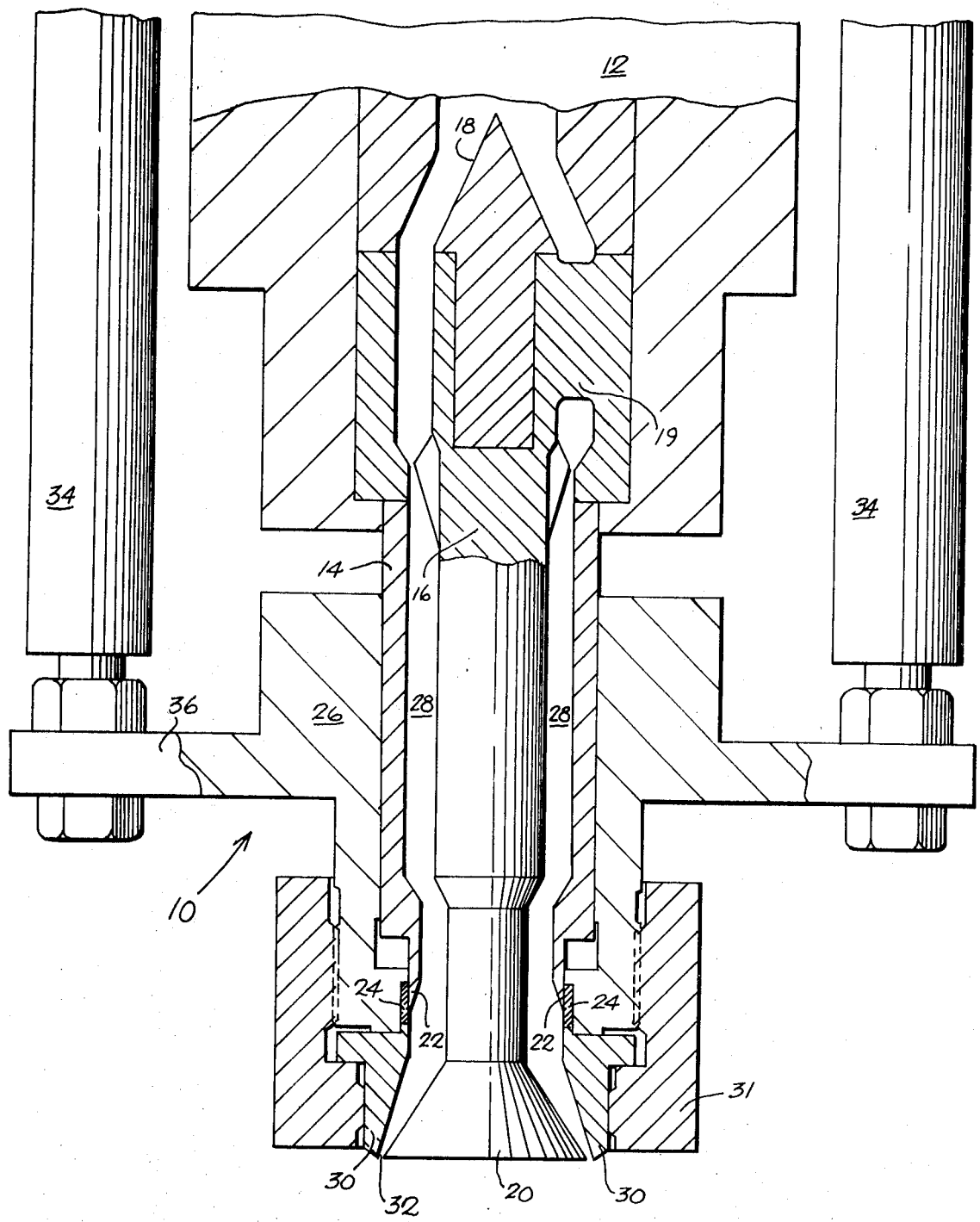
FIG. 1 is a partial cross-sectional view of the preferred embodiment of the invention.

As illustrated in FIG. 1, the extruder head 10 comprises inlet block 12 having defined therein an inlet port (not shown). Depending from inlet block 12 is extrusion barrel 14 which, in turn, supports mandrel 16 by foraminous securing means such as spider 18.

Figure 2:
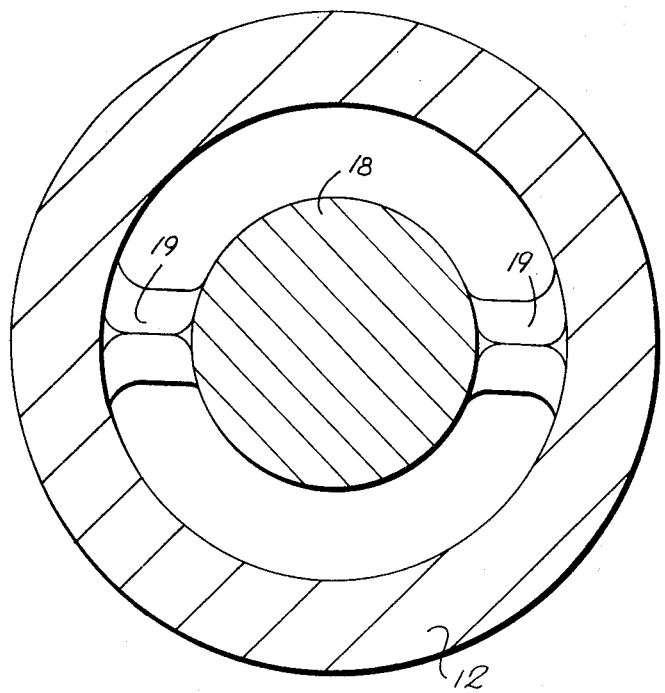
FIG. 2 is a top view illustrating the spider assembly of the apparatus of this invention; and, FIG. 3 is a view similar to that of FIG. 1 showing alternative construction of the preferred embodiment of the invention.

The details of spider 18 are shown in FIG. 2. Support webs 19 of spider 18 are preferably of thin section in the direction of flow of the extrudate and, insofar as necessary for mechanical strength, elongated in the direction of flow.

Optionally, mandrel 16 may be hollow to permit flow of heating, cooling or other fluid. Often it is advantageous to provide an air port (not shown) at mandrel foot 20 to conduct air to the interior of the parison during extrusion and to provide cooling of the mandrel foot. Fluids may be introduced into the hollow mandrel 16 by means of passages (not shown) in webs 19.

Knife edge 22 of extrusion barrel 14 constitutes a critical aspect of this invention. Knife edge 22 bears against insert sealing surface 24 of die support assembly 26 in order to maintain the integrity of extrusion passage 28 at that junction. Die assembly 26 is slidably disposed on extrusion barrel 14 in such a fashion as to permit longitudinal movement therebetween. Knife edge 22 and sealing surface 24, in combination, serve both as a bearing and sliding seal during such relative movement between die support assembly 26 and extrusion barrel 14.

Die 30 is affixed to die support assembly 26 by means of collar 31 and, with mandrel foot 20, defines terminus 32 of extrusion passage 28. Terminus 32 may be varied in size by movement of die 30 relative to the mandrel foot 20. It is this valving action which permits variations in the wall thickness of extruded parisons.

Figure 3:
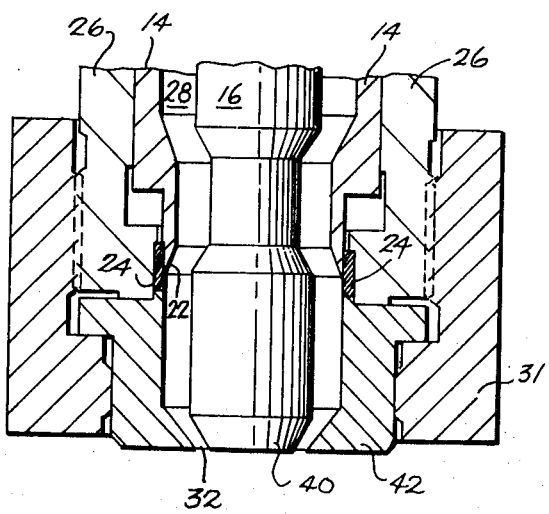

As shown in FIG. 3, the terminus 32 of extrusion passage 28 may be readily varied by substituting, for instance, a smaller diameter mandrel foot 40 and smaller diameter die 42. Otherwise, the construction, and particularly the critical knife edge 22 and sealing surface 24, are essentially unchanged.

Die support assembly 26 is attached to yoke 34 by means of arms 36. Yoke 34, in turn, interfaces with parison programming means (not shown) such as that illustrated in the above-mentioned patents.

Thus, the input movement necessary to properly program a parison is provided by any of the conventional parison programmers. This input movement is transmitted to die assembly 26 by means of arms 36 and is ultimately reflected in variations of the area of terminus 32 as a result of movement of die 30 relative to mandrel foot 20.

In order to accommodate movement of die 30, it is necessary that movement in at least some portion of the defining walls of extrusion passage 28 take place. Heretofore, such movement has been accommodated in such a manner as to promote degradation of easily degradable vinyl polymers. However, by providing knife edge 22 and sealing surface 24, such movement may be accommodated without introducing unworkable disruptions or variations in extrusion passage 28. This simple feature thus solves a serious problem which has heretofore seriously hindered the use of vinyl polymers in blow molding operations.

Sealing surface 24 may be of any bearing material which will tolerate the temperatures and pressures involved, but is preferably of a self-lubricating fluorinated olefin composition such as polytetrafluoroethylene (Teflon). All of the surfaces defining extrusion passage 28 are preferably of stainless steel in order to curtail damage to such surfaces should degradation occur.

From the above description, it is apparent that a programmable extrusion head having smooth, uninterrupted full passages is provided when a knife edge juncture between the movable portions of the defining walls of the flow passage is utilized. Extruder heads utilizing this critical feature have, in fact, been operated for extended commercially acceptable times when the knife edge feature is utilized, while extruder heads employing the more conventional structures sans the knife edge feature have operated for only short times before degradation of vinyl polymers has occurred.

It will be apparent from the above description and drawings that various modifications of the extruder head may be made within the scope of the invention. Therefore, the invention is not intended to be limited to the particular examples or illustrations employed except as may be required by the following claims.

What is claimed is:

1. An extruder head comprising, an inlet block having defined therethrough an extrusion passage, an extrusion barrel fixedly depending from the inlet block, foraminous securing means fixedly locating a mandrel within but spaced-apart from the interior of the extrusion barrel, a die assembly including a die slidably secured upon the extrusion barrel with the die adjacent an end of the mandrel, and means adapted to transmit longitudinal motion relative to the extrusion barrel to the die assembly, the interface between the extrusion barrel and the die assembly being a knife edge on one member the end of which bears upon an insert bearing surface of a self-lubricating fluorinated olefin composition on the other and is sealed thereat over the full range of said longitudinal motion of one member relative to the other, whereby an extrusion outlet defined by the mandrel and die may be varied by movement of the die assembly and die while maintaining an essentially streamlined configuration of the interface between the extrusion barrel and the die assembly by accommodating movement therebetween by moving the knife edge of one member over the surface of the other.

2. An extruder head as set forth in claim 1 wherein the insert bearing surface is polytetrafluoroethylene.

3. An extruder head comprising, an inlet block having defined therethrough an extrusion passage, an extrusion barrel having a substantially circular cross-section bore fixedly depending from the inlet block, a spider assembly attached to the inlet block and to a mandrel, said mandrel being positioned substantially concentrically within the interior of the extrusion barrel, a die assembly slidably journaled upon the extrusion barrel, a die secured in the bottom portion of the die assembly by means of a collar, an insert bearing surface secured in the die assembly and contiguous with the inner surface of the die, a knife edge formed on the bottom portion of the extrusion barrel and bearing upon the insert surface of polytetrafluoroethylene so as to form a seal therebetween at the end of said knife edge, and means adapted to transmit longitudinal motion relative to the extrusion barrel to the die assembly, whereby the die assembly may be moved relative to the extrusion barrel with the relative motion being accommodated by the knife edge bearing upon the insert surface throughout the range of said longitudinal motion.

References Cited
UNITED STATES PATENTS

| 3,096,128 | 7/1963 | Wight | 308—N UX |
| 3,144,682 | 8/1964 | Thielfoldt | 18—14 V UX |
| 3,453,690 | 7/1969 | Mayner | 18—14 V UX |
| 3,466,704 | 9/1969 | Fogelberg et al. | 18—14 V UX |

WILLIAM S. LAWSON, Primary Examiner

L. GILDEN, Assistant Examiner

U.S. Cl. X.R.

18—56 V; 264—209